(12) United States Patent
Lozano Sevilla et al.

(10) Patent No.: US 8,649,897 B2
(45) Date of Patent: Feb. 11, 2014

(54) LAYING-UP METHOD FOR NON-PLANAR COMPOSITE COMPONENTS

(75) Inventors: Alberto Lozano Sevilla, Madrid (ES); José Orencio Granado Macarrilla, Madrid (ES); Vicente Martínez Valdegrama, Madrid (ES); Raúl Burgos Gallego, Madrid (ES)

(73) Assignee: Airbus Operations S.L., Madrid (ES)

( * ) Notice: Subject to any disclaimer, the term of this patent is extended or adjusted under 35 U.S.C. 154(b) by 41 days.

(21) Appl. No.: 13/235,570

(22) Filed: Sep. 19, 2011

(65) Prior Publication Data

US 2012/0301681 A1 Nov. 29, 2012

(30) Foreign Application Priority Data

May 27, 2011 (ES) .................................. 201130883

(51) Int. Cl.
*G06F 19/00* (2011.01)
*B32B 3/00* (2006.01)

(52) U.S. Cl.
USPC ............ 700/118; 428/156; 428/174; 428/179

(58) Field of Classification Search
USPC .................. 700/118, 119; 428/156, 174, 179
See application file for complete search history.

(56) References Cited

U.S. PATENT DOCUMENTS

| | | | |
|---|---|---|---|
| 4,696,707 A | 9/1987 | Lewis et al. | |
| 2006/0073309 A1 | 4/2006 | Hogg | |
| 2006/0073311 A1 | 4/2006 | Hogg | |
| 2006/0180270 A1* | 8/2006 | Ledet et al. ................... | 156/250 |
| 2009/0056995 A1* | 3/2009 | Maeda et al. ................. | 174/259 |

FOREIGN PATENT DOCUMENTS

| | | |
|---|---|---|
| EP | 2 248 659 A1 | 11/2010 |
| ES | 2 267 367 A1 | 3/2007 |
| ES | 2 345 622 T3 | 9/2010 |

* cited by examiner

*Primary Examiner* — Sean Shechtman
(74) *Attorney, Agent, or Firm* — Ladas & Parry LLP

(57) ABSTRACT

A method for laying-up the tapes of a prepeg composite material in the 0° direction of a non-planar composite component on a suitable mold using an ATL machine includes the steps of: a) determining the trajectories of the tapes as modified trajectories of geodesic trajectories complying with the following conditions in their projections in an horizontal plane: that the curvature radius $R_2$ of their curved segments is bigger than a predetermined value $R_{min}$; that the gap $G_{2p}$ between two contiguous tapes is comprised between 0 and a predetermined value $G_{max}$; and b) providing modified trajectories to the ATL machine. The invention also refers to a non-planar composite component such as an skin of an aircraft wing having the tapes in the 0° direction following trajectories complying with conditions described.

4 Claims, 3 Drawing Sheets

LAYING-UP METHOD FOR NON-PLANAR COMPOSITE COMPONENTS

FIELD OF THE INVENTION

The present invention refers to the fabrication of composite components and more in particular to the fabrication of non-planar composite components such as the skin of a torsion box of an aircraft wing using an Automated Tape Laying machine.

BACKGROUND OF THE INVENTION

Composite component manufacturing methods comprising a lay-up stage where layers of a composite material in a roll format are placed in a mould of suitable shape and a curing stage are well known in the aeronautical industry as well as in other industries.

The composite materials that are most used in the aeronautical industry consist of fibers or fiber bundles embedded in a matrix of thermosetting or thermoplastic resin, in the form of a preimpregnated or "prepreg" material. Their main advantages refer to:
  Their high specific strength with respect to metallic materials.
  Their excellent behavior under fatigue loads.
  The possibilities of structural optimization thanks to the anisotropy of the material and the possibility of combining fibers with different orientations, allowing the design of the elements with different mechanical properties adjusted to the different needs in terms of applied loads.

The layers of composite material are not placed randomly, but are arranged in each zone in a number and with an orientation of their fibre reinforcement, typically of carbon fibre, that depend on the nature and the magnitude of the stresses that are to be withstood by the component in each zone. Thus, each zone has a particular structure of the arrangement or stacking of the layers. The difference in thickness between the different zones generates drop-offs in the layers, which requires having a ply model for each component establishing how to the arrange the layers on the jig during the stacking process.

The lay-up stage is usually carried out using Automatic Tape Laying machines (hereinafter ATL machines) for laying unidirectional (UD) or fabric tapes. The tapes are laid directly upon a mould according to the shape of the component with its reinforcing fibers in the orientation established by the designer. The ATL machine shall then be provided with the trajectories to be followed for laying up the tapes of the composite material (usually CFRP prepeg).

The trajectories for the tapes in the 0° direction in a contoured surface shall desirably follow a "natural path" understanding for that a path in which the tape will follow the contoured surface without stretching or puckering while being laid.

The determination of said "natural path" for non-planar surfaces is however difficult.

In a first approach it was proposed to determine the trajectories for the tapes in the 0° direction as geodesic curves (i.e. curves which are locally straight with respect to the surface because its geodesic curvature is equal to zero at every point) but it was found that this trajectories involve excessive gaps between adjacent tapes of the typical dimensions used in the industry.

US 2006/0073309 disclose a method for calculating trajectories for the tapes in the 0° direction that avoid said excessive gaps and also the production of wrinkles on the tapes as a trajectory defined by a plurality of natural path segments, each of them defining a non-natural angle relative to adjacent segments of the path so that a transverse edge of each tape is disposed within a predetermined offset distance interval from an adjacent tape. The implementation of this method for large composite parts of a complex geometry such as aircraft wing skins having a double curvature involves computing problems and does not assure the absence of wrinkles.

It would be thus desirable a laying-up method where said desired trajectories could be easily calculated and provided to the ATL machine.

SUMMARY OF THE INVENTION

It is an object of the present invention to provide a laying-up method of the tapes of a prepeg composite material in the 0° direction of a non-planar composite component on a suitable mould using an ATL machine wherein the trajectories of said tapes are determined so that they can be laid-up by the ATL machine without producing wrinkles.

It is another object of the present invention to provide a laying-up method of the tapes of a prepeg composite material in the 0° direction of a non-planar composite component on a suitable mould using an ATL machine wherein the trajectories of said tapes can be easily calculated.

It is another object of the present invention to provide non-planar composite components having the tapes of the composite material duly laid for avoiding defects such as wrinkles, excessive gaps between contiguous tapes and overlaps between contiguous tapes.

In one aspect these and another objects are met by a method for laying-up the tapes of a prepeg composite material in the 0° direction of a non-planar composite component on a suitable mould using an ATL machine comprising steps of: a) determining the trajectories of said tapes as modified trajectories of geodesic trajectories complying with the following conditions in their projections in an horizontal plane: that the curvature radius $R_2$ of their curved segments is bigger than a predetermined value $R_{min}$; that the gap $G_{2p}$ between two contiguous tapes is comprised between 0 and a predetermined value $G_{max}$; b) providing said modified trajectories to said ATL machine.

In embodiments of the present invention, said step a) comprises the following sub-steps: a1) projecting the geodesic trajectories corresponding to said tapes on an horizontal plane; a2) modifying the horizontal projected trajectories for complying with the above-mentioned conditions; a3) obtaining the modified trajectories on the corresponding laying-up surfaces by means of an intersection of said surfaces with a vertical plane by the modified horizontal trajectories. Therefore it is provided a method that can be implemented using hardware and software means which are usually available in a laying-up process using an ATL machine.

In embodiments of the present invention said predetermined value $R_{min}$ is 400 mm for a tape of a width of 300 mm; and said predetermined value $G_{max}$ is 3.5 mm. Therefore it is provided a method where the trajectories in the 0° direction comply with the quality requirements.

In embodiments of the present invention, said component is the skin of an aircraft wing. Therefore it is provided a method for the laying-up of the tapes in the 0° direction in a large component of a complex geometry that allows an automated laying-up process.

In another aspect the above-mentioned objects are met by a non-planar composite component (particularly the skin of an aircraft wing) comprising tapes of a composite material in the 0° direction disposed following trajectories complying with the following conditions in their projections in an horizontal plane: the curvature radius $R_2$ of their curved segments is bigger than a predetermined value $R_{min}$; the gap $G_{2p}$ between two contiguous tapes is comprised between 0 and a predetermined value $G_{max}$.

Other characteristics and advantages of the present invention will be clear from the following detailed description of embodiments illustrative of its object in relation to the attached figures.

DETAILED DESCRIPTION OF THE INVENTION

Automated procedures for the lay-up stage in composite component manufacturing methods are well known in the art. ATL machines have a movable tape delivery head mechanism mounted between parallel guides that can be moved along multiple axis to place a prepreg tape on a variety of mould shapes. The prepreg tape, usually provided in a large roll format, contains uncured composite material held on a backing paper which is removed as the tape is placed on the mould.

When laying-up a specific component the tapes are laid moving the tape delivery head mechanism of the ATL machine along trajectories determined taking into account the geometry of the surface and a proper set of instructions. These trajectories can be provided to the ATL machines in a predetermined format or can be generated using available processing means in the ATL machine.

Figure 1:
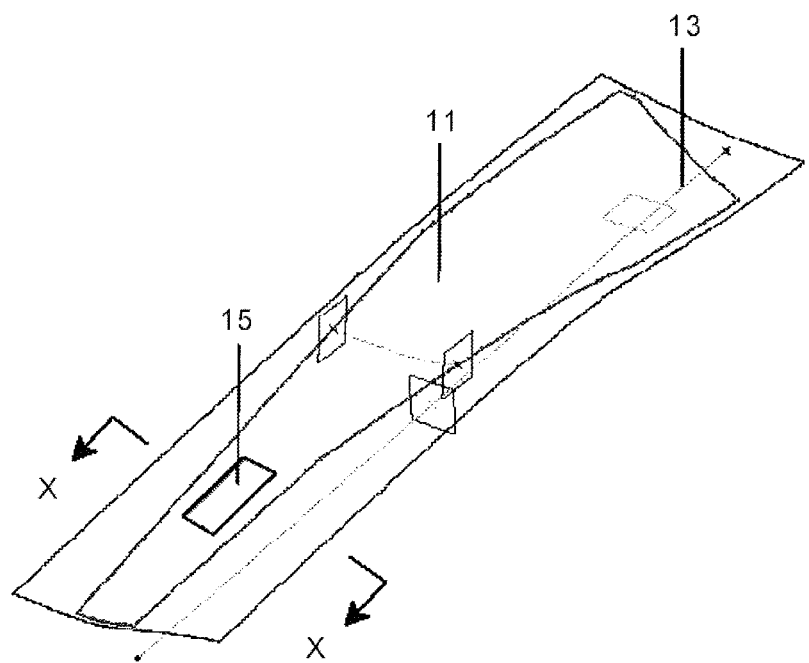
FIG. 1 shows a schematic plan view of a skin of an aircraft wing.
Figure 2:
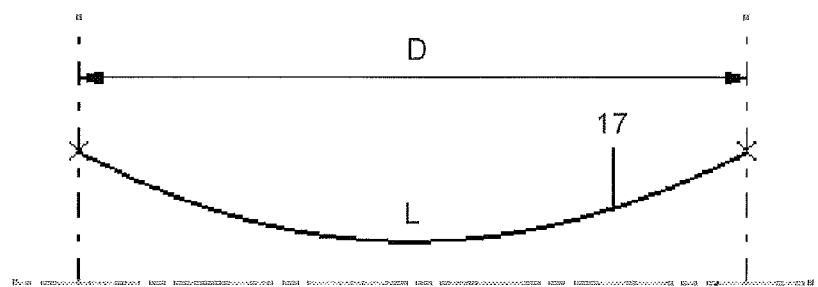
FIG. 2 shows a typical cross section of a zone of said skin.

We will now describe the determination of the trajectories for the tapes in the 0° direction according to this invention for a skin 11 of a torsion box of an aircraft wing which is represented in FIG. 1. The 0° direction is indicated by line 13. FIG. 2 shows a cross section of a zone 15 of said skin 11 with a significant difference between the length L of the curve 17 of the skin 11 in said cross section and the distance D of a projection of said curve 17 over an horizontal plane. En each zone of the skin 11 the ratio D/L is variable.

The starting point are the trajectories provided by the computing means of the currently used ATL machines (typically geodesic-based trajectories).

Figure 3A:
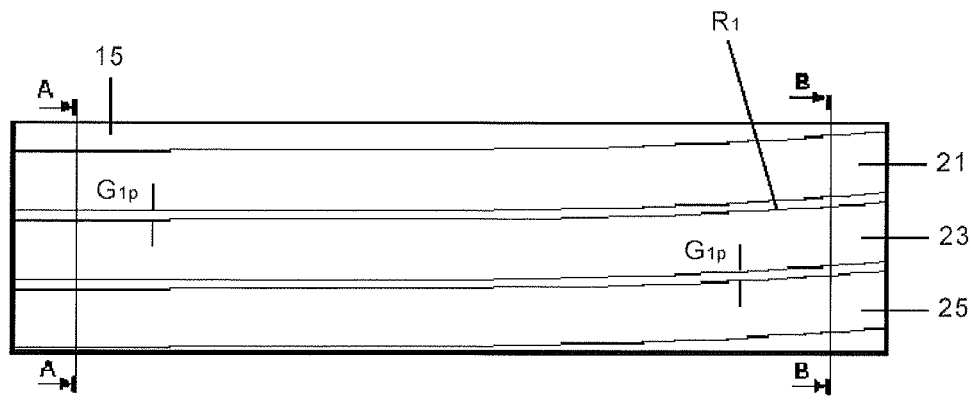
FIG. 3a shows schematically the projection over an horizontal plane of a zone of said skin with three adjacent tapes disposed following known geodesic trajectories.
Figure 3B:
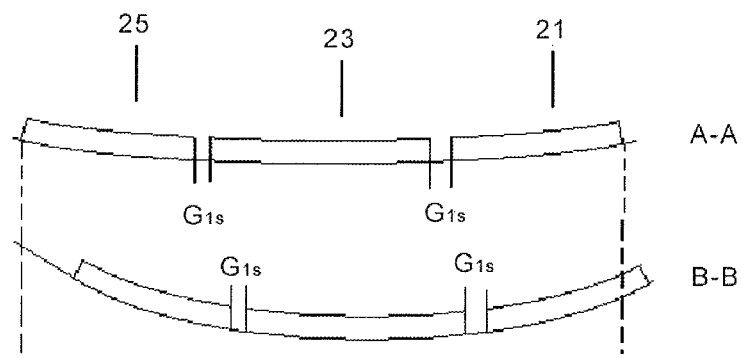
FIG. 3b shows schematically cross sections of FIG. 3a by the planes A-A and B-B.

FIG. 3a shows said starting trajectories for three tapes 21, 23, 25 disposed over for said zone 15 of the skin laying-up surface projected over the ground plane (an horizontal plane). FIG. 3b shows cross sections of said zone 15 by the plane A-A (with a high ratio D/L) and by the plane B-B (with a lower ratio D/L).

The projected starting trajectories over the ground plane (FIG. 3a) are parallel trajectories with a constant gap $G_{1p}$ between the tapes 21, 23, 25 and have a certain curvature radius $R_1$ on those sections of the skin with lower ratio D/L. On the laying-up surface (FIG. 3b) the gap $G_{1s}$ between the tapes 21, 23, 25 in the cross section A-A and between the tapes 21, 23, 25 in the cross section B-B are variable under predetermined limits. If those limits cause that said radius R1 is small the tapes 21, 23, 25 are laid with a tension in the laying-up surface that causes winkles in the areas with said curvature radius $R_1$. The lower $R_1$ the higher the tension is and an early wrinkle occurs. Therefore $R_1$ shall have a minimum value that can not be exceeded as happens in many cases and does not happen in the case of large parts of complex curvature such as large wing skins.

Figure 4A:
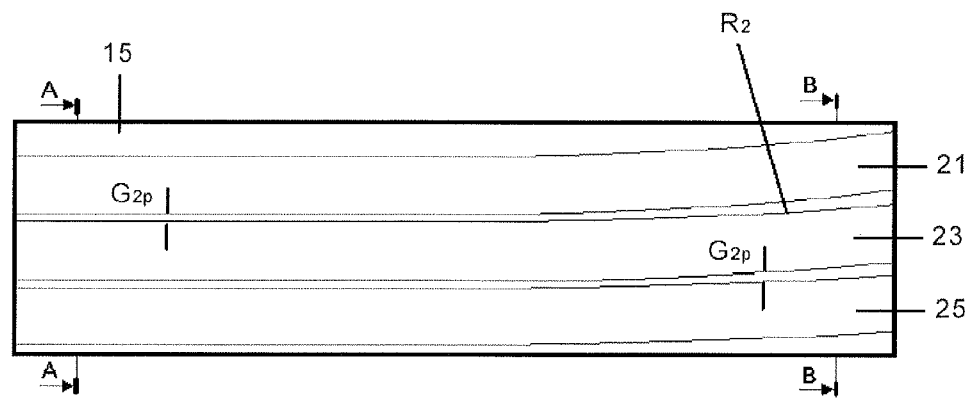
FIG. 4a shows schematically the projection over an horizontal plane of a zone of said skin with three adjacent tapes disposed following trajectories determined according to this invention.
Figure 4B:
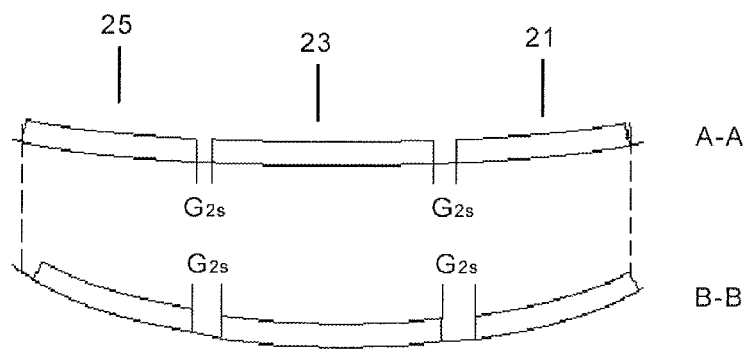
FIG. 4b shows schematically cross sections of FIG. 4a by the planes A-A and B-B.

FIG. 4a shows the trajectories of three tapes 21, 23, 25 disposed over said zone 15 of the skin laying-up surface projected over the ground plane according to the invention and FIG. 4b shows cross sections of said zone 15 by the plane A-A (with a high ratio D/L) and by the plane B-B (with a lower ratio D/L).

The projected trajectories over the ground plane (FIG. 4a) are non-parallel trajectories with a variable gap $G_{2p}$ between the tapes 21, 23, 25 and have a curvature radius $R_2 > R_1$ on those sections of the skin with lower ratio D/L so that the tapes 21, 23, 25 are laid in the laying-up surface with a lower tension that avoid the winkles.

On the laying-up surface (FIG. 4b) the gap $G_{2s}$ between the tapes 21, 23, 25 in the cross section A-A are similar to the previous case but in the cross section B-B the gap $G_{2s}$ is bigger. It is therefore accepted that the gaps $G_{2s}$ between tapes can be bigger in those areas with a lower ratio D/L, not exceeding in any case a predetermined value $G_{max}$.

An operative procedure for the determination of the trajectories comprise the following steps:
 a) modifying the projections of the starting trajectories on the ground plane so that their curved segments have a curvature radius $R_2$ bigger than a predetermined minimum radius $R_{min}$ and the gap $G_{2p}$ is comprised between 0 and a maximum predetermined value $G_{max}$;
 b) obtaining the trajectories on the corresponding laying-up surfaces by means of an intersection of said surfaces with a vertical plane by said modified trajectories.

According to experimental data obtained by the inventors, good results have been obtained with the following values of the above-mentioned parameters:

$R_{min}$=400 mm for a tape of a width of 300 mm.
$G_{max}$=3.5 mm.

It has also been observed that if in a trajectory of a tape in the 0° direction the difference in length between the two borders of the tape in a particular zone exceed 2.5 mm, a wrinkle appears. In the trajectories according to the present invention said difference in length does not exceed 2.5 mm.

Although the present invention has been fully described in connection with preferred embodiments, it is evident that modifications may be introduced within the scope thereof, not considering this as limited by these embodiments, but by the contents of the following claims.

The invention claimed is:

1. A method for laying-up the tapes of a prepeg composite material in the 0° direction of a non-planar composite component on a suitable mould using an automatic tape laying machine comprising steps of:
 a) determining the trajectories of said tapes as modified trajectories of geodesic trajectories complying with the following conditions in their projections in an horizontal plane:
   that the curvature radius $R_2$, of their curved segments is bigger than a predetermined value $R_{min}$;

that the gap $G_{2p}$ between two contiguous tapes is comprised between 0 and a predetermined value $G_{max}$;

b) providing said modified trajectories to said automatic tape laying machine.

2. A method according to claim 1, wherein said step a) comprises the following sub-steps:
   a1) projecting the geodesic trajectories corresponding to said tapes on an horizontal plane;
   a2) modifying the horizontal projected trajectories for complying with the above-mentioned conditions;
   a3) obtaining the modified trajectories on the corresponding laying-up surfaces by means of an intersection of said surfaces with a vertical plane by the modified horizontal trajectories.

3. A method according to claim 1, wherein:
   said predetermined value $R_{min}$ is 400 mm for a tape of a width of 300 mm;
   said predetermined value $G_{max}$ is 3.5 mm.

4. A method according to claim 1, wherein said component is the skin of an aircraft wing.

\* \* \* \* \*